United States Patent
Huang

(10) Patent No.: US 9,255,388 B2
(45) Date of Patent: Feb. 9, 2016

(54) SWITCH STRUCTURE OF WATER OUTLET OF WALL-MOUNTED FAUCET

(71) Applicant: Li-Chen Huang, Changhua (TW)

(72) Inventor: Li-Chen Huang, Changhua (TW)

(73) Assignee: Alexander Yeh Industry Co. Ltd., Changhua (TW)

( * ) Notice: Subject to any disclaimer, the term of this patent is extended or adjusted under 35 U.S.C. 154(b) by 122 days.

(21) Appl. No.: 14/095,058

(22) Filed: Dec. 3, 2013

(65) Prior Publication Data

US 2015/0152626 A1      Jun. 4, 2015

(51) Int. Cl.
| | |
|---|---|
| G05D 11/00 | (2006.01) |
| E03C 1/04 | (2006.01) |
| F16K 15/02 | (2006.01) |
| F16K 11/044 | (2006.01) |

(52) U.S. Cl.
CPC .............. *E03C 1/0404* (2013.01); *F16K 15/028* (2013.01); *E03C 2201/30* (2013.01); *F16K 11/0445* (2013.01); *Y10T 137/2685* (2015.04); *Y10T 137/9464* (2015.04)

(58) Field of Classification Search
CPC ............ F16K 11/0445; E03C 2201/30; Y10T 137/2685; Y10T 137/9464
USPC ........... 137/119.05, 801; 251/322, 323; 4/678
See application file for complete search history.

(56) References Cited

U.S. PATENT DOCUMENTS

| | | | |
|---|---|---|---|
| 7,258,322 B1* | 8/2007 | Yang | 251/323 |
| 7,857,286 B1* | 12/2010 | Huang | 251/322 |
| 8,613,294 B2* | 12/2013 | Yeh | 137/801 |
| 8,763,624 B1* | 7/2014 | Huang | 137/119.05 |
| 2012/0266989 A1* | 10/2012 | Huang | 137/798 |
| 2012/0266990 A1* | 10/2012 | Huang | 137/801 |

* cited by examiner

*Primary Examiner* — R. K. Arundale
(74) *Attorney, Agent, or Firm* — Che-Yang Chen; Law Office of Michael Chen

(57) ABSTRACT

A water output switch structure of a faucet includes a water output switch structure of a faucet comprising a faucet main body, a water guiding duct, a switch valve, and a positioning unit including an adapter, a locking unit, a water-stopping pad and a water-stopping ring. The switch valve has a valve stick that moves horizontally, so a pulling head of the valve stick would not fall down unexpectedly due to gravity to change the status of water output.

4 Claims, 6 Drawing Sheets

SWITCH STRUCTURE OF WATER OUTLET OF WALL-MOUNTED FAUCET

FIELD OF THE INVENTION

The present invention relates to a switch structure of a wall-mounted faucet's water outlet, and more particularly to a switch structure that is in front of the wall-mounted faucet to change the status of water output.

BACKGROUND OF THE INVENTION

For some faucets that can be used for showing and bathtub, there are usually two ways to output water: one is directly from the upper portion of the bathtub to provide a significant amount of water in the bathtub for the user; and the other is to connect to the shower head for the user taking shower. When these two different ways to output water are used in one faucet, the user uses a switch valve to switch the way of water output. Namely, when the faucet is turned on, the water is usually flowing from the faucet to the container underneath (bathtub), and when the user wants to switch another way of water output, the user pulls up the switch to close the water channel to the faucet, so the water ends up spraying out from the shower head. Meanwhile, the switch valve is supported by the water pressure so it would not fall down until the water source is shut. And the water pressure inside the faucet starts decreasing and the switch valve falls down when the water pressure is less than the weight of the switch valve.

However, the conventional structure still has some problems. For example, conventional switch valves can be easily affected by gravity so the pulling unit may fall down unexpectedly, especially when the water pressure is low and the status of water output would be changed accordingly. Therefore, there remains a need for a new and improved switch structure to overcome the problems stated above. The present invention is a continuous-in-part from application Ser. No. 13/783,888, filed on Mar. 4, 2013.

SUMMARY OF THE INVENTION

The technical problem the present invention wants to solve is described above, and the present invention provides a switch structure of a faucet includes a faucet main body, a water guiding duct, a switch valve, and a positioning unit including an adapter, a locking unit, a water-stopping pad and a water-stopping ring. A dividing board inside the faucet main body is used to separate a downward water output chamber and a rear tubular body. Top portion of the dividing board has a through connecting hole and a corresponding through hole on the faucet main body is aligned with the connecting hole. The water guiding duct has a first tubular body and second tubular body. A stopping edge is located inside the first tubular body and a bracket is suspended at front end thereof. Center of the bracket has a shaft hole, periphery of which has at least one surrounding through hole. The water guiding duct is inside the rear tubular body and the first tubular body and the connecting holes are connected, so that the water guiding duct is used to connect with water source. The switch valve has a valve stick that is inside the shaft hole and corresponding through hole, and extends toward front end of the faucet main body. The valve stick has a water stopping unit inside the first tubular body through an enlarging portion, and a spring is disposed between the enlarging portion and the bracket of the first tubular body. With the spring, the valve stick can be pushed backwards to prevent the water stopping unit from blocking the stopping edge of the first tubular body, which causes the closing of the water flow. The rear end of the valve stick is supported by a restricting cover, and a plurality of supporting legs are surrounded at the periphery of the restricting cover. The supporting legs are provided for the first tubular body and second tubular body, so that the restricting cover can be secured in the water guiding duct. A pulling head is disposed at a portion where the valve stick extends out from the faucet main body. Center of the adapter has a through opening that has a circular groove therein to receive the water-stopping ring, and the adapter connects with the water source through the through opening. More specifically, the locking unit is inserted into the adapter through the periphery thereof to push against the water source to secure the adapter on the water source. Through the engagement of the second tubular body and the adapter, water can be transported into the faucet main body, and the water-stopping pad is disposed between the adapter and second tubular body.

Comparing with the prior arts, the present invention has the following advantages: (i) the valve stick moves horizontally, so the pulling head would not fall down unexpectedly due to gravity to change the status of water output; (ii) the locking unit is used to push against the water source and the second tubular body engages with the adapter to secure the faucet main body, so the engaging strength is enhanced and the number of components are reduced; and (iii) the water-stopping pad is disposed between the adapter and second tubular body to increase the sealing effect between the water guiding duct and the positioning unit.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
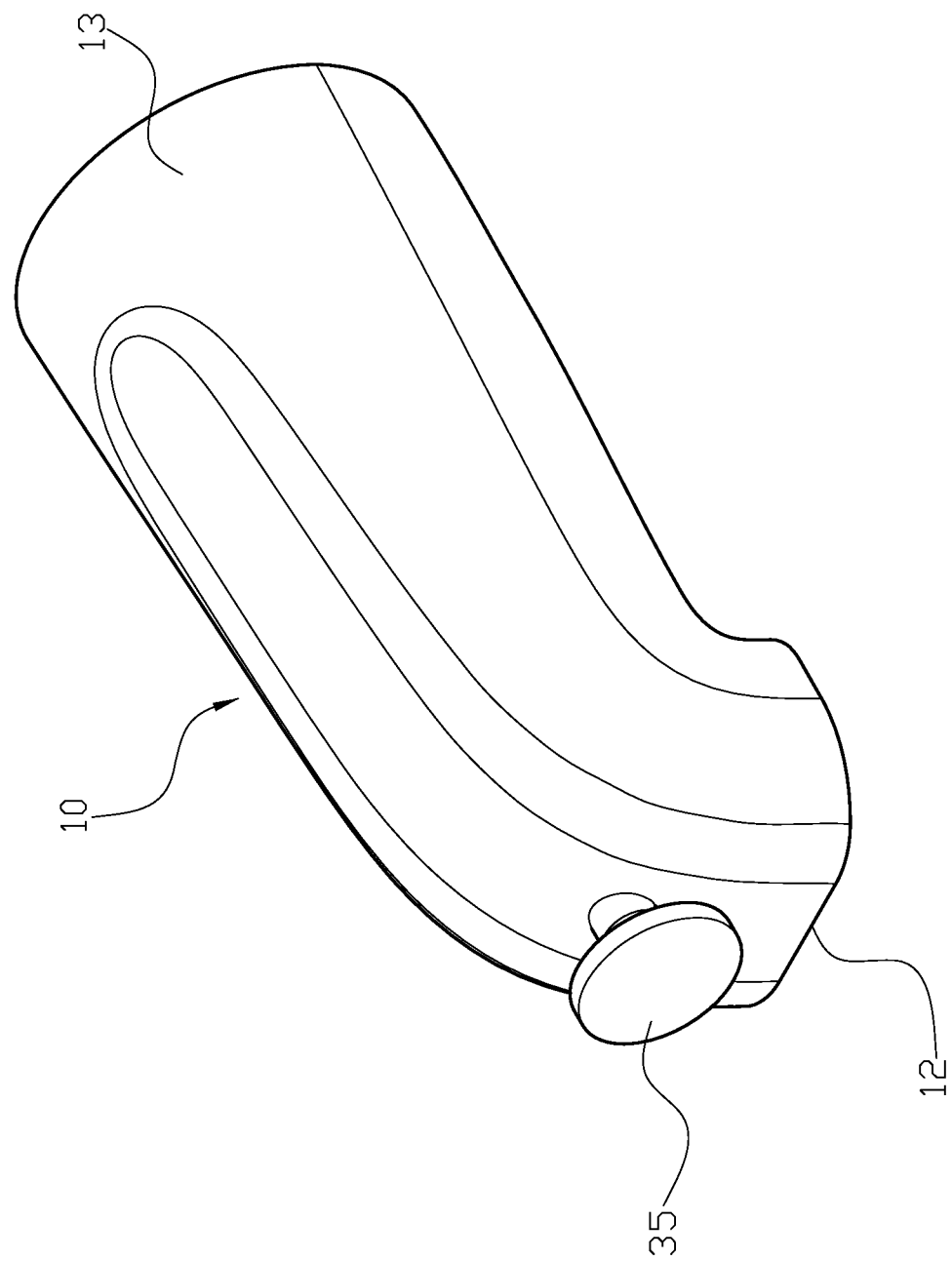
FIG. 1 illustrates a three-dimensional assembled view of the present invention.
Figure 2:
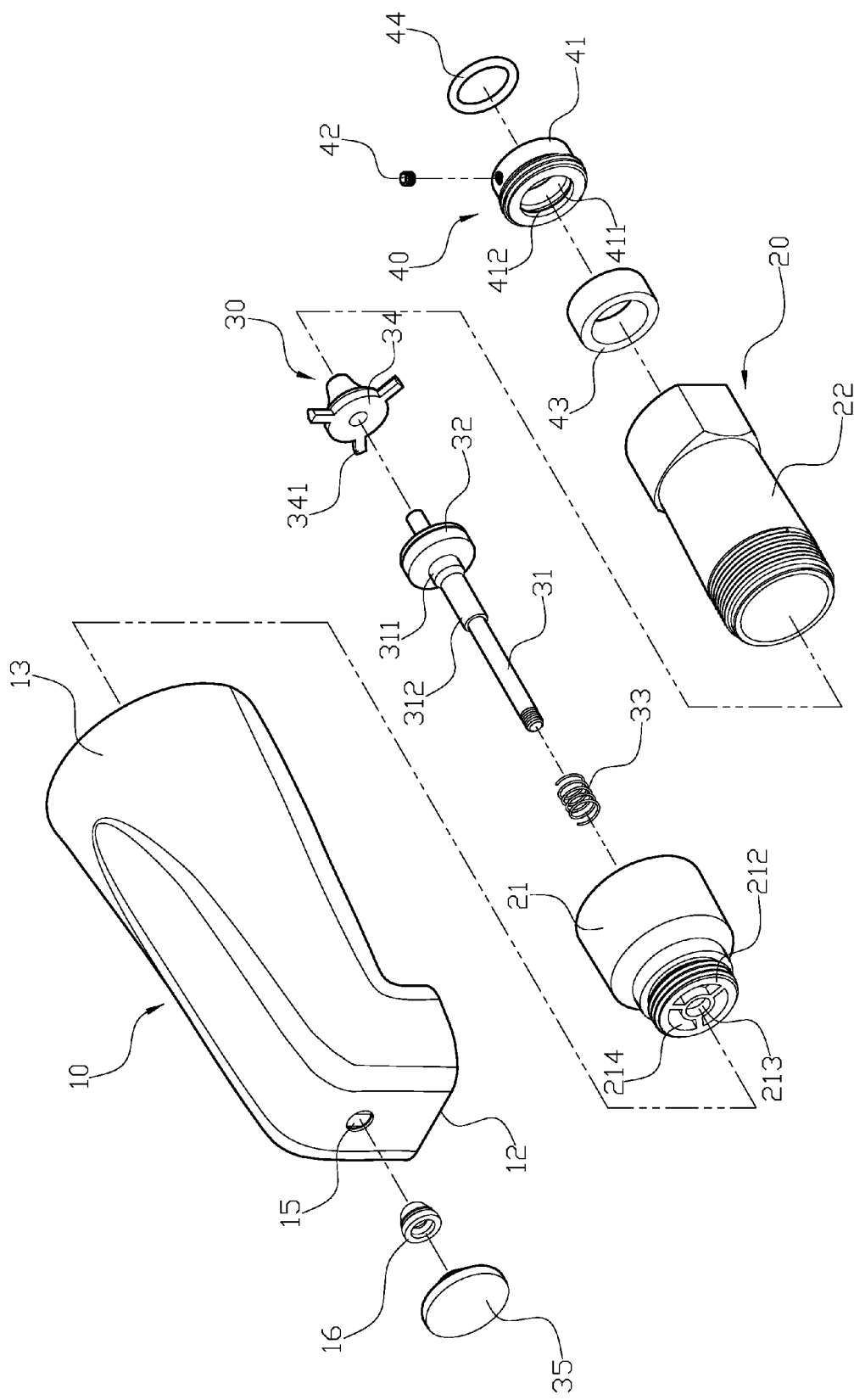
FIG. 2 illustrates a three-dimensional exploded view of the present invention.
Figure 3:
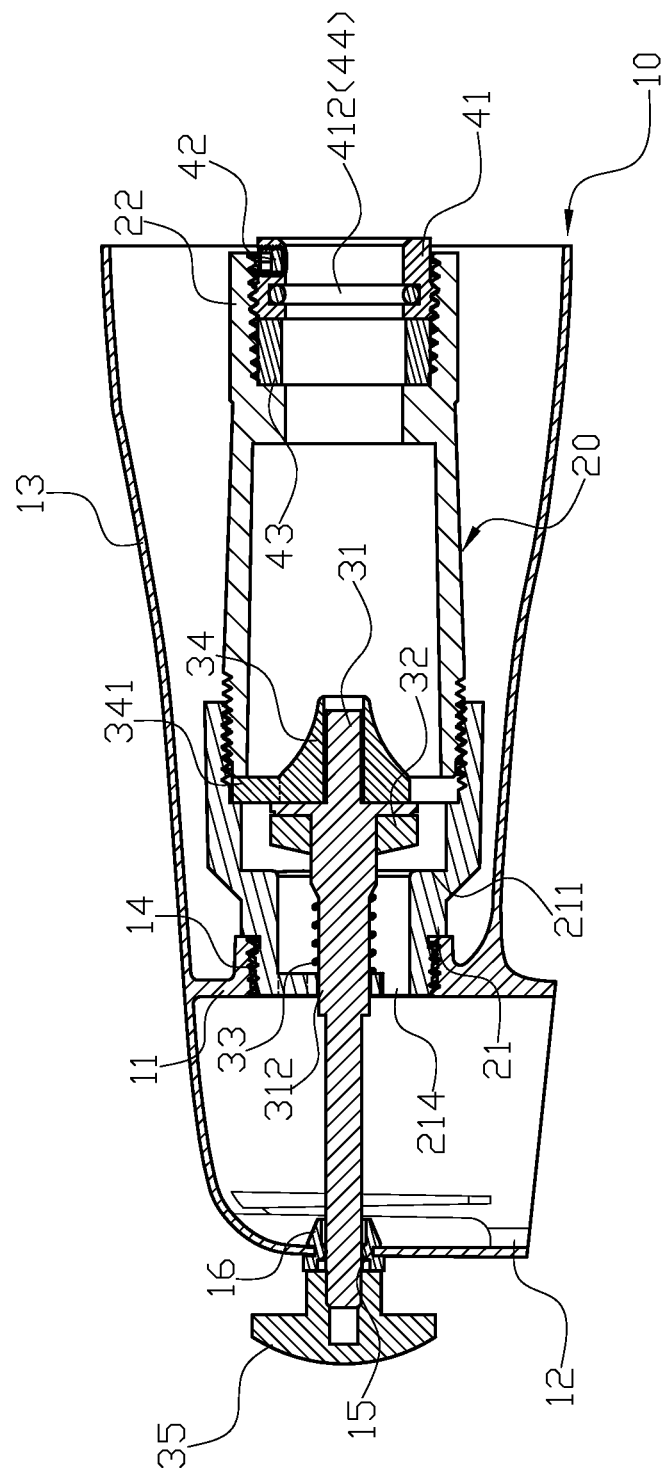
FIG. 3 illustrates a sectional view of the present invention.

In order to further understand the goal, characteristics and effect of the present invention, a number of embodiments along with the drawings are illustrated as following:

Referring to FIGS. 1 to 3, the present invention includes a faucet main body (10), a water guiding duct (20), a switch valve (30), and a positioning unit (40) including an adapter (41), a locking unit (42), a water-stopping pad (43) and a water-stopping ring (44). A dividing board (11) inside the faucet main body (10) is used to separate a downward water output chamber (12) and a rear tubular body (13). Top portion of the dividing board (11) has a through connecting hole (14) and a corresponding through hole (15) on the faucet main body (10) is aligned with the connecting hole (14). The water guiding duct (20) has a first tubular body (21) and second tubular body (22). A stopping edge (211) is located inside the first tubular body (21) and a bracket (212) is suspended at front end thereof. Center of the bracket (212) has a shaft hole (213), periphery of which has at least one surrounding through hole (214). The water guiding duct (20) is inside the rear tubular body (13) and the first tubular body (21) and the connecting holes (14) are connected, so that the water guiding duct (20) is used to connect with water source (50). The switch valve (30) has a valve stick (31) that is inside the shaft hole (213) and corresponding through hole (15), and extends toward front end of the faucet main body (10). The valve stick (31) has a water stopping unit (32) inside the first tubular body (21) through an enlarging portion (311), and a spring (33) is disposed between the enlarging portion (311) and the bracket (212) of the first tubular body (21). With the spring (33), the valve stick (31) can be pushed backwards to prevent the water stopping unit (32) from blocking the stopping edge (211) of the first tubular body (21), which causes the closing of the water flow. The rear end of the valve stick (31) is supported by a restricting cover (34), and a plurality of supporting legs (341) are surrounded at the periphery of the restricting cover (34). The supporting legs (341) are provided for the first tubular body (21) and second tubular body (22), so that the restricting cover (34) can be secured in the water guiding duct (20). A pulling head (35) is disposed at a portion where the valve stick (31) extends out from the faucet main body (10). Center of the adapter (41) has a through opening (411) that has a circular groove (412) therein to receive the water-stopping ring (44), and the adapter (41) connects with the water source (50) through the through opening (411). More specifically, the locking unit (42) is inserted into the adapter (41) through the periphery thereof to push against the water source (50) to secure the adapter (41) on the water source (50). Through the engagement of the second tubular body (22) and the adapter (41), water can be transported into the faucet main body (10), and the water-stopping pad (43) is disposed between the adapter (41) and second tubular body (22).

Figure 4:
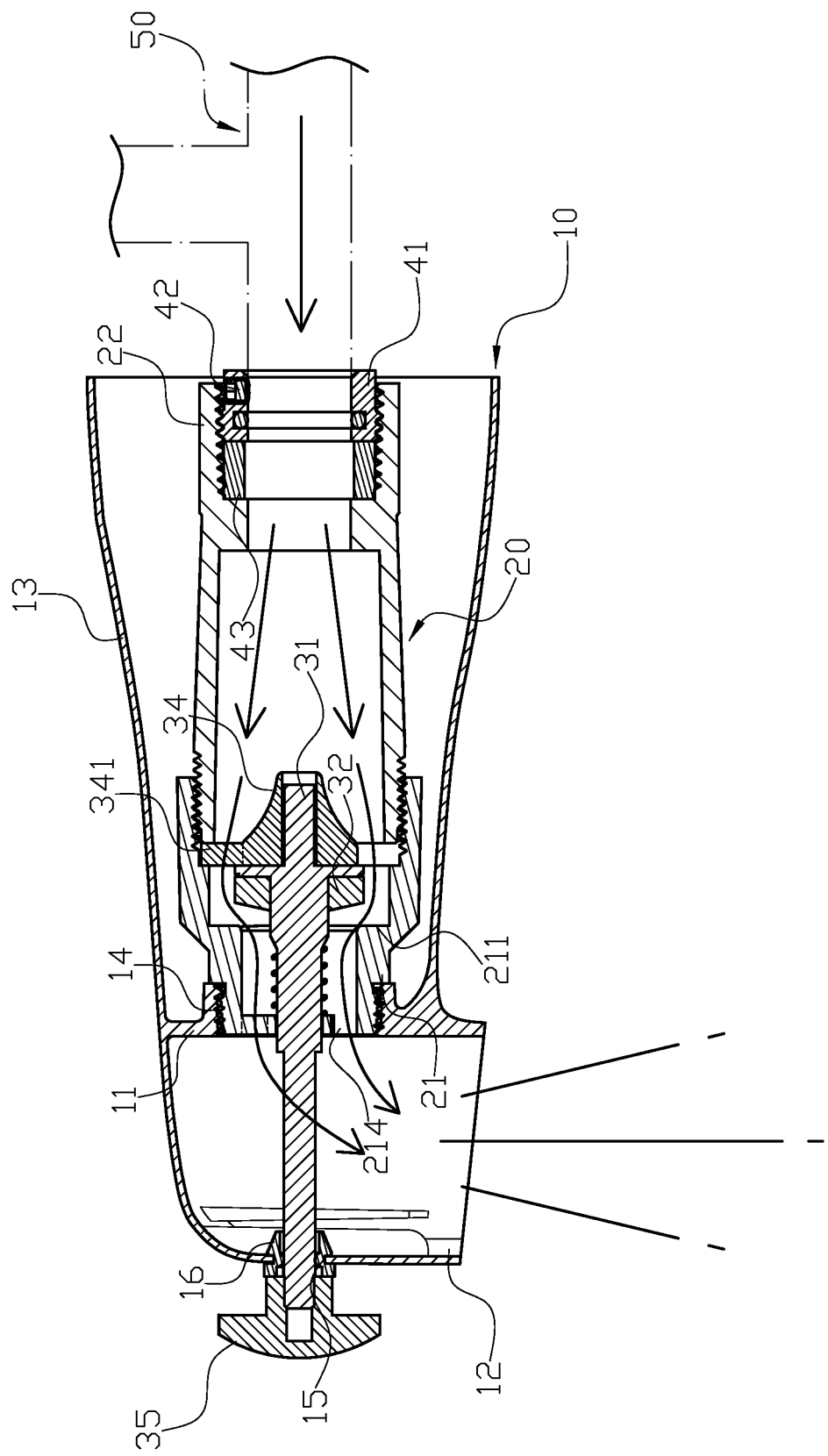
FIG. 4 illustrates a schematic view when water is outputted from a lower portion of the faucet in the present invention.
Figure 5:
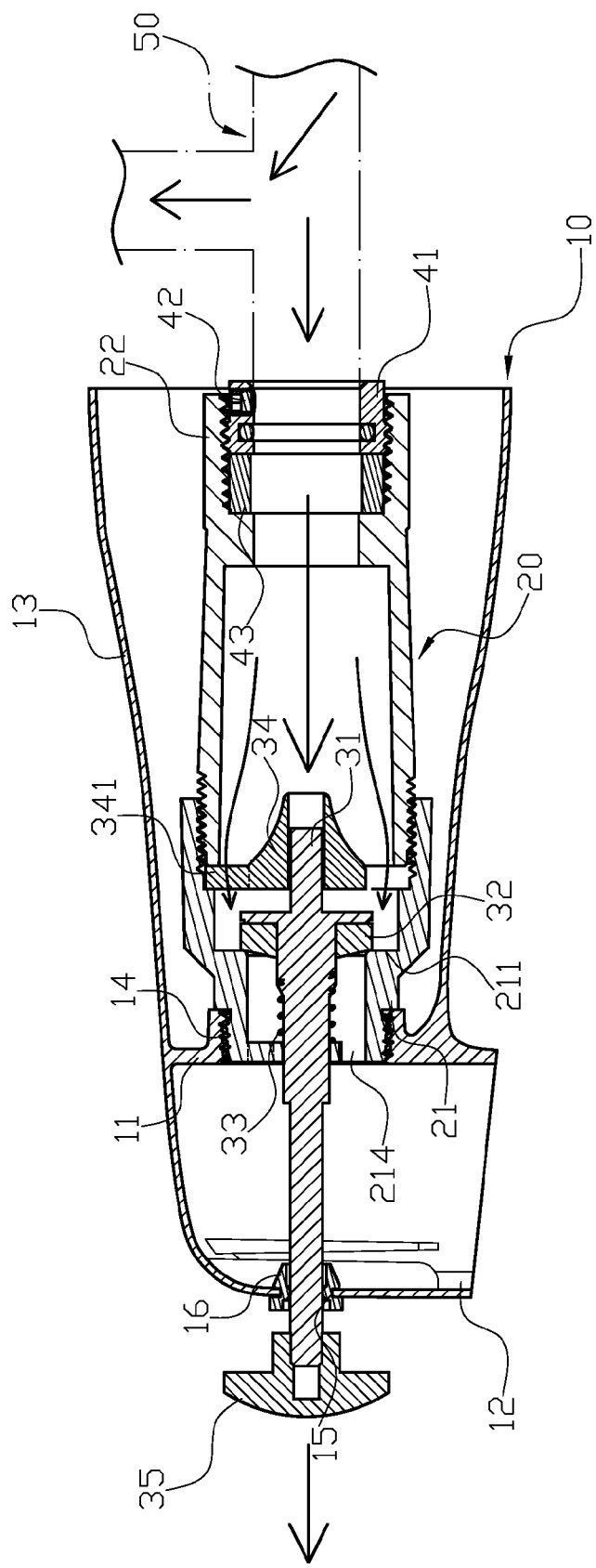
FIG. 5 illustrates a schematic view when water is outputted from an upper portion of the faucet in the present invention.

Referring to FIG. 4, when the pulling head (35) is not used, the water will flow directly from the water source (50) to the water output chamber (12) through the water guiding duct (20) and the surrounding through hole (214) of the first tubular body (21), and the water can be accumulated in the container or bathtub underneath. When the valve stick (31) is pulled through the pulling head (35) (see FIG. 5), the water stopping unit (32) can block the water flow at the stopping edge (211). At this time, the water would goes up to the shower head to spray out for users taking shower. Also, the valve stick (31) that has moved forward and the water stopping unit (32) that has been supported by water pressure would not rebound until the water source is shut. When the water source is shut, the water pressure of the water faucet is reduced suddenly, and the valve stick (31) and the water stopping unit (32) would be pushed back, so that the faucet main body (10) can work under normal conditions.

In another embodiment, a ladder-shaped portion (312) is disposed between the front end of the valve stick (31) and the enlarging portion (311), and the ladder-shaped portion (312) is inserted into the shaft hole (213) to secure the valve stick (31) in the shaft hole (213) and prevent the valve stick (31) from shaking when the valve stick (31) is pulled or bounced back.

Figure 6:
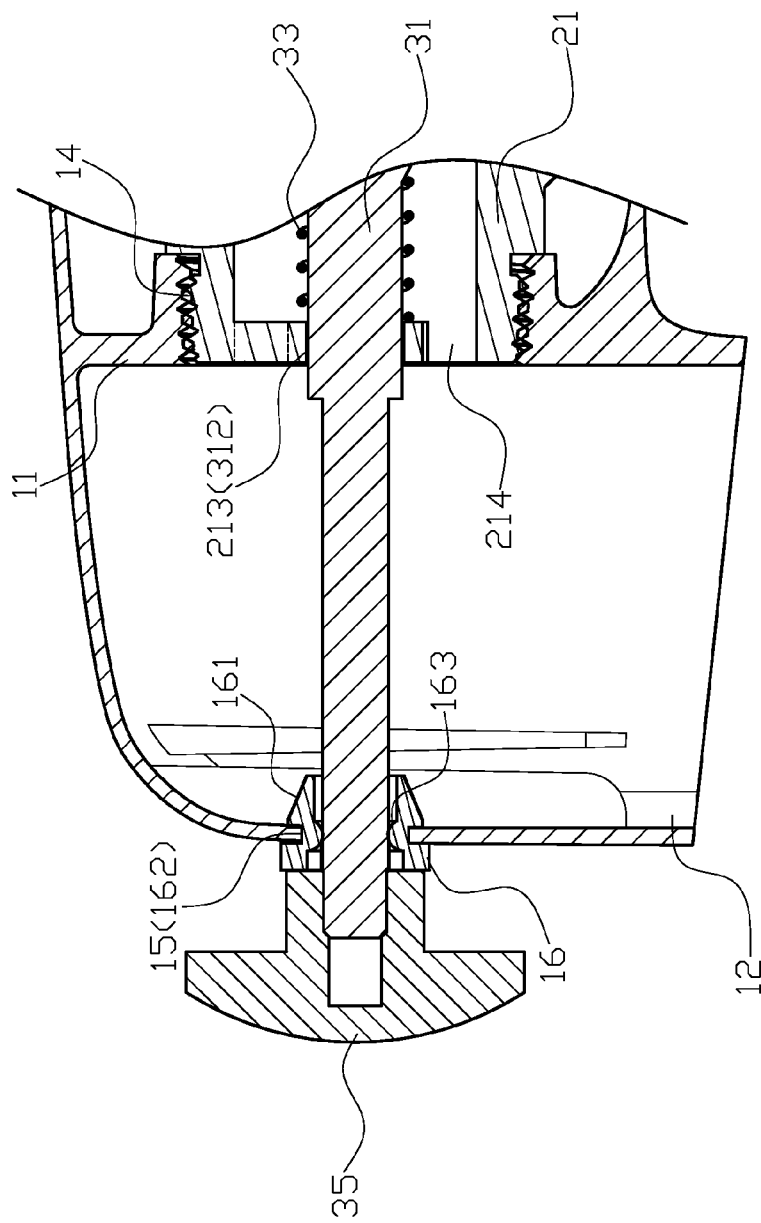
FIG. 6 is a partial enlarging sectional view of the faucet in the present invention.

In a further embodiment, a water-stopping cap (16) is disposed between the valve stick (31) and the corresponding through hole (15) of the faucet main body (10). One end of the water-stopping cap (16) has a cone-shaped guiding surface (161), so the water-stopping cap (16) can be more easily inserted into the corresponding through hole (15). An engaging groove (162) is at center portion of the water-stopping cap (16) to further secure the water-stopping cap (16) on the faucet main body (10). A protruding edge (163) that is at inner wall of the water-stopping cap (16) is used to block the water flow (see FIG. 6).

According to the embodiments described above, the present invention has the following advantages: (i) the valve stick (31) moves horizontally, so the pulling head (35) would not fall down unexpectedly due to gravity to change the status of water output; (ii) the locking unit (42) is used to push against the water source (50) and the second tubular body (22) engages with the adapter (41) to secure the faucet main body (10), so the engaging strength is enhanced and the number of components are reduced; and (iii) the water-stopping pad (43) is disposed between the adapter (41) and second tubular body (22) to increase the sealing effect between the water guiding duct (20) and the positioning unit (40).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water output switch structure of a faucet comprising a faucet main body, a water guiding duct, a switch valve, and a positioning unit including an adapter, a locking unit, a water-stopping pad and a water-stopping ring, wherein the faucet main body includes a downward water output chamber and a rear tubular body, and a dividing board inside the faucet main body is used to separate said downward water output chamber and said rear tubular body, wherein a top portion of the dividing board has a through connecting hole, and a corresponding through hole on the faucet main body is aligned with the connecting hole, wherein the water guiding duct has a first tubular body and second tubular body, and a stopping edge is located inside the first tubular body and a bracket is suspended at front end thereof, a center of the bracket having a shaft hole, and a periphery of the shaft hole having at least one surrounding through hole, wherein the water guiding duct is inside the rear tubular body, the first tubular body and the connecting hole are connected, so that the water guiding duct is used to connect with a water source, wherein the switch valve has a valve stick that is inside the shaft hole and corresponding through hole, and extends toward a front end of the faucet main body, the valve stick having a water stopping unit inside the first tubular body through an enlarging portion, and a spring disposed between the enlarging portion and the bracket of the first tubular body, wherein the valve stick is pushed backwards by said spring to prevent the water stopping unit from blocking the stopping edge of the first tubular body, which causes the blocking of the water flow, wherein a rear end of the valve stick is supported by a restricting cover, and a plurality of supporting legs surround a periphery of the restricting cover, and the supporting legs are provided for the first tubular body and second tubular body, so that the restricting cover is secured in the water guiding duct, wherein a pulling head is disposed at a portion of the valve stick which extends exterior to the faucet main body, wherein a center of the adapter has a through opening that has a circular groove therein to receive the water-stopping ring, and the adapter connects with the water source through the through opening, wherein the locking unit is inserted into the adapter through the periphery thereof to push against the water source to secure the adapter on the water source, and through the engagement of the second tubular body and the adapter, water is transported into the faucet main body, and the water-stopping pad is disposed between the adapter and second tubular body.

2. The water output switch structure of a faucet of claim 1, wherein the valve stick includes a stepped portion between a front end of the valve stick and the enlarging portion of the valve stick, wherein a diameter of the stepped portion is greater than the front end and less than the enlarging end.

3. The water output switch structure of a faucet of claim 1, wherein a water-stopping cap is disposed between the valve stick and the corresponding through hole of the faucet main body.

4. The water output switch structure of a faucet of claim 3, wherein one end of the water-stopping cap has a cone-shaped guiding surface, an engaging groove at center portion of the water-stopping cap to further secure the water-stopping cap on the faucet main body, a protruding edge at an inner wall of the water-stopping cap to block the water flow.

\* \* \* \* \*